United States Patent
Liu et al.

(10) Patent No.: US 12,498,580 B2
(45) Date of Patent: Dec. 16, 2025

(54) VIRTUAL IMAGE DISPLAY SYSTEM AND DISPLAY METHOD THEREOF

(71) Applicant: HTC Corporation, Taoyuan (TW)

(72) Inventors: Kuei-Chun Liu, Taoyuan (TW); Wei Chun Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 111 days.

(21) Appl. No.: 18/665,575

(22) Filed: May 16, 2024

(65) Prior Publication Data

US 2025/0355250 A1    Nov. 20, 2025

(51) Int. Cl.
*G02B 27/01* (2006.01)
*G02B 27/09* (2006.01)

(52) U.S. Cl.
CPC ..... *G02B 27/0172* (2013.01); *G02B 27/0961* (2013.01); *G02B 27/0983* (2013.01); *G02B 2027/013* (2013.01)

(58) Field of Classification Search
CPC ............ G02B 27/0172; G02B 27/0961; G02B 27/0983; G02B 2027/013
See application file for complete search history.

(56) References Cited

U.S. PATENT DOCUMENTS

| | | | | |
|---|---|---|---|---|
| 2004/0227063 | A1* | 11/2004 | Viinikanoja | G02B 27/646 348/E5.046 |
| 2018/0041739 | A1* | 2/2018 | Otani | H04N 13/30 |
| 2023/0388480 | A1 | 11/2023 | Borer | |

FOREIGN PATENT DOCUMENTS

| | | |
|---|---|---|
| CN | 110488490 | 11/2019 |
| TW | 202235955 | 9/2022 |
| TW | 202235965 | 9/2022 |

OTHER PUBLICATIONS

"Office Action of Taiwan Counterpart Application", issued on Jan. 24, 2025, p. 1-p. 11.

* cited by examiner

*Primary Examiner* — Seung C Sohn
(74) *Attorney, Agent, or Firm* — JCIPRNET

(57) ABSTRACT

Disclosed are a virtual image display system and a display method. The virtual image display system includes a projection device and an eye-resting device. The projection device is disposed to: provide a plurality of image beams corresponding to each zone; converge the image beams to generate a plurality of converged image beams respectively; and filter the corresponding converged image beams to generate a plurality of filtered image beams, wherein the filtered image beams have a plurality of different traveling directions corresponding to various zones. The eye-resting device reflects the filtered image beams to form an image on a virtual aperture plane corresponding to the target region.

16 Claims, 5 Drawing Sheets

VIRTUAL IMAGE DISPLAY SYSTEM AND DISPLAY METHOD THEREOF

BACKGROUND

Technical Field

The present disclosure relates to a virtual image display system and a display method thereof, and in particular, to a virtual image display system and a display method thereof that may reduce vergence-accommodation conflict.

Description of Related Art

In reality, measurement of distance with human eyes is performed through the action of two sets of physiological reactions: vergence and accommodation. Eye vergence represents the rotation of human eyes. When looking at an object in a close distance, both eyes simultaneously rotate toward the bridge of the nose. If the object is farther away, the rotation angle of eyes becomes smaller. Eye accommodation represents the zooming action of the intraocular lens. The human eyes automatically adjust focus, change the curvature of the intraocular lens by using the force or relaxation of the ciliary muscle to converge the light emitted by the object on the retina.

However, in existing virtual image displays, binocular parallax is normally adopted to create a three-dimensional sense for a user. The left and right eyes receive specifically calculated parallax images simultaneously to satisfy the vergence response. However, such method is not adaptable for designing different focal planes for distant and near objects in an image, which means that any position in the image is reflected by the same focal plane. Although such design allows the eyeball to have correct vergence response and sense the distance of the object, since there is only one focal plane in the image, the eyeball accommodation function will only focus on one position. Therefore, the above two sets of physiological reactions will conflict with each other and are likely to cause some users to experience dizziness and nausea, leading to a phenomenon called Vergence Accommodation Conflict (VAC).

SUMMARY

The present disclosure provides a virtual image display system and a display method thereof, which may effectively reduce the discomfort caused by Vergence Accommodation Conflict (VAC).

A virtual image display system of the present disclosure includes a projection device and an eye-resting device. The projection device is disposed to: provide a plurality of image beams corresponding to each zone; converge the image beams to generate a plurality of converged image beams respectively; and filter the corresponding converged image beams to generate a plurality of filtered image beams, wherein the filtered image beams have a plurality of different traveling directions corresponding to various zones. The eye-resting device is disposed between the projection device and a target region, and reflects the filtered image beams to form an image on a virtual aperture plane corresponding to the target region.

The virtual image display method of the present disclosure includes: dividing the projection device into a plurality of zones; making the projection device to provide a plurality of image beams corresponding to each of the zones; converging the image beams to generate a plurality of converged image beams respectively; filtering the corresponding converged image beams to generate a plurality of filtered image beams, wherein the filtered image beams have a plurality of different traveling directions corresponding to various zones; and making the eye-resting device to reflect the filtered image beams to form an image on a virtual aperture plane corresponding to the target region.

Based on the above, the virtual image display system of the present disclosure may adjust the incident angle of the reflected image beams corresponding to each image beam on the virtual aperture plane generated by the eye-resting device according to the position information of the image beams emitted from different positions of the display. In this way, the user's eyeballs may reproduce complete light field information on the virtual aperture plane, and may effectively reduce the discomfort caused by VAC.

DESCRIPTION OF THE EMBODIMENTS

Figure 1:
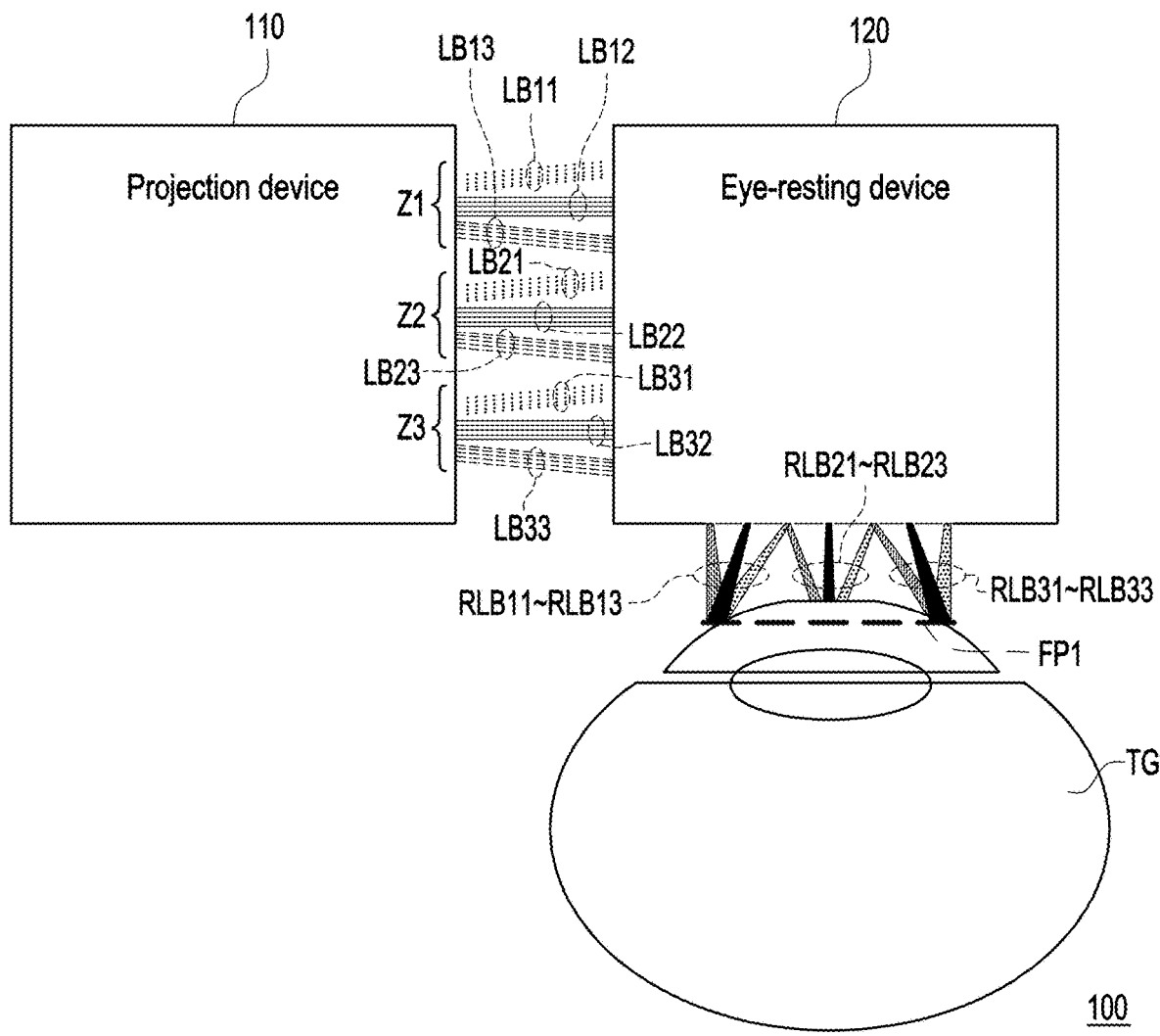
FIG. 1 shows a virtual image display system according to an embodiment of the present disclosure.

Please refer to FIG. 1, FIG. 1 illustrates a virtual image display system according to an embodiment of the present disclosure. The virtual image display system 100 may be a display system that may provide virtual reality (VR) effects, augmented reality (AR) effects, or mixed reality (MR) effects. The virtual image display system 100 includes a projection device 110 and an eye-resting device 120. The projection device 110 may have a plurality of zones Z1 to Z3, and may send a plurality of filtered image beams LB11 to LB13, LB21 to LB23, and LB31 to LB33 corresponding to various zones Z1 to Z3. The filtered image beams LB11 to LB13, LB21 to LB23, and LB31 to LB33 are sent to the eye-resting device 120. The eye-resting device 120 is disposed between the projection device 110 and the target region TG. The eye-resting device 120 receives the filtered image beams LB11 to LB13, LB21 to LB23 and LB31 to LB33, and generates corresponding reflected light beams RLB11 to RLB13, RLB21 to RLB23 and RLB31 to RLB33 by reflecting the filtered image beams LB11 to LB13, LB21 to LB23 and LB31 to LB33. The eye-resting device 120 transmits the reflected light beams RLB11 to RLB13, RLB21 to RLB23, and RLB31 to RLB33 to the target region TG, and thereby forming an on the virtual aperture plane FP1 on the target region TG.

In this embodiment, the target region TG may be the location region where the user's eyeballs are located.

It is worth mentioning that in this embodiment, the traveling directions of the plurality of light rays in each of the filtered light beams LB11 to LB33 are parallel to each other. Moreover, corresponding to each of the zones Z1 to Z3, the filtered light beams LB11 to LB33 in each zone Z1 to Z3 respectively have multiple different traveling directions. For example, the traveling directions of the filtered light beams LB11, LB12, and LB13 corresponding to the zone Z1 are different. There is a non-zero included angle between the traveling directions of the filtered light beams LB11 and LB12, and there is also another non-zero included angle between the traveling directions of the filtered light beams LB13 and LB12.

In addition, when the reflected light beams RLB11 to RLB13, RLB21 to RLB23 and RLB31 to RLB33 are incident on the virtual aperture plane, they may have different incident angles respectively.

Figure 2:
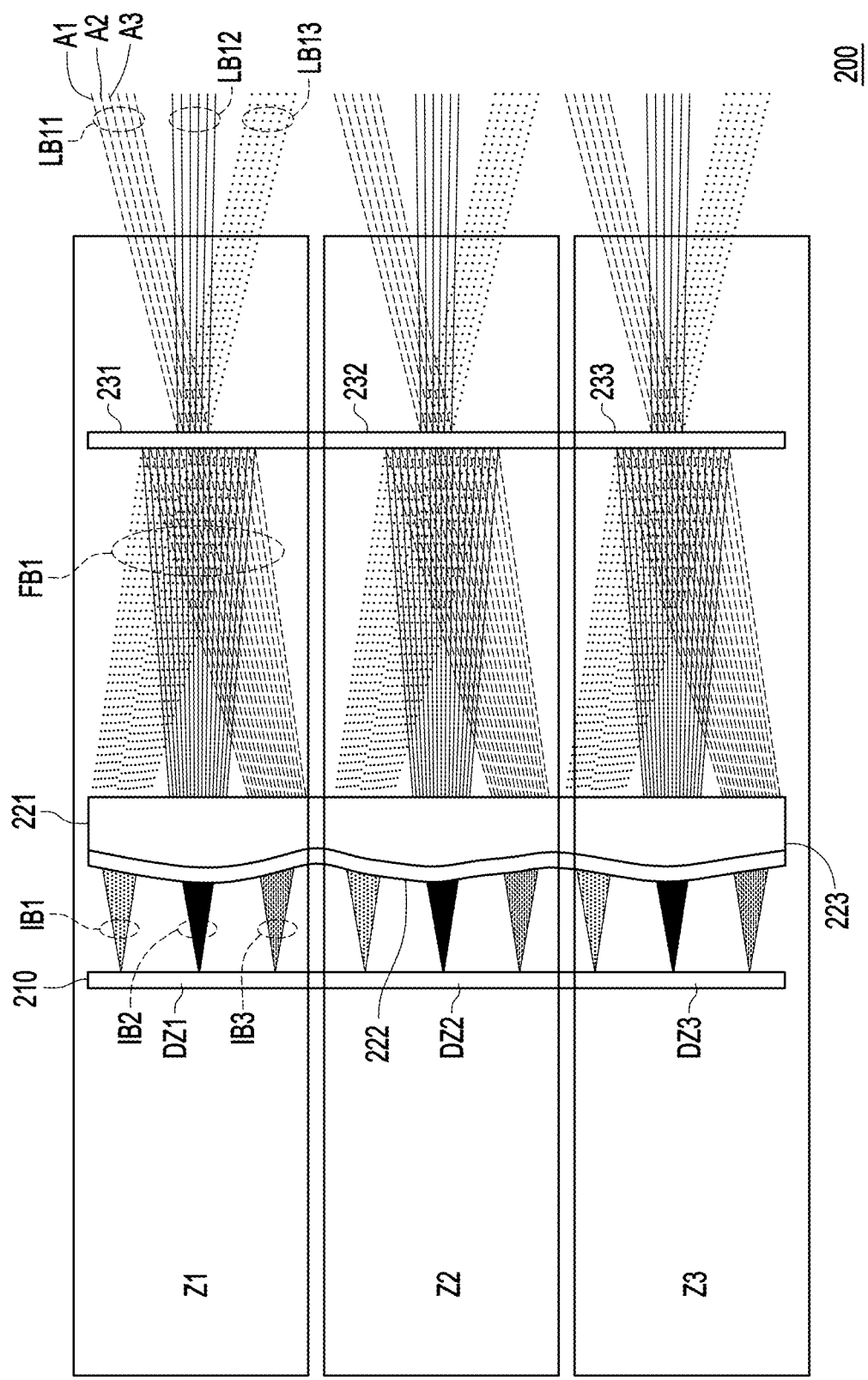
FIG. 2 is a schematic diagram of an implementation of a projection device according to an embodiment of the present disclosure.

Regarding the implementation details of the projection device 110, please refer to FIG. 2 which is a schematic diagram of an implementation of the projection device according to an embodiment of the present disclosure. In FIG. 2, the projection device 200 has a plurality of zones Z1 to Z3. The projection device 200 includes a display 210, array lenses 221 to 223, and filters 231 to 233. The display 210 may be divided into a plurality of display regions DZ1, DZ2 and DZ3 corresponding to the zones Z1 to Z3 respectively. The display regions DZ1, DZ2 and DZ3 may respectively provide multiple image beams. Taking the display region DZ1 as an example, the display region DZ1 may provide multiple image beams IB1 to IB3 at different positions.

The array lenses 221 to 223 are respectively disposed corresponding to the display regions DZ1, DZ2 and DZ3, and are disposed to receive a plurality of image beams sent by the display 210. Taking the array lens 221 as an example, the array lens 221 is disposed to receive the image beams IB1 to IB3 generated on the display region DZ1 and converge the image beams IB1 to IB3 to generate a plurality of converged image beams FB1.

The filters 231 to 233 are respectively disposed corresponding to the array lenses 221 to 223. The filters 231 to 233 are disposed to filter the converged image beams generated by the array lenses 221 to 223, and thereby generating filtered image beams. Taking the filter 231 as an example, the filter 231 receives the converged image beam FB1 generated by the array lens 221 and filters the converged image beam FB1 to generate a plurality of filtered image beams LB11 to LB13.

Taking the filtered image beam LB11 as an example, the filtered image beam LB11 has a plurality of image rays A1 to A3, wherein the traveling directions of the image rays A1 to A3 are parallel to each other.

In this embodiment, the array lenses 221 to 223 may all be microlens arrays, and the filters 231 to 233 may all be array pinhole filters. The display 210 may be a flat-panel display.

In this embodiment, the display 210 may be a single display and divided into a plurality of zones Z1 to Z3. In other embodiments of the present disclosure, the display 210 may also be formed by splicing sub-displays respectively disposed in the zones Z1 to Z3, and there is no limitation to the disclosure.

Incidentally, the projection device 200 may be divided into N times M zones, N and M may be integers greater than 2, and N and M may be the same or different.

It is worth noting that in this embodiment, the projection device 200 may convert the image position information of the image beams IB1 to IB3 into the angle information of the traveling direction of the corresponding filtered image beams LB11 to LB13. For details, please refer to FIG. 3, which is a schematic diagram illustrating the conversion method of the image position information of the image beams and the angle information of the traveling direction of the filtered image beams in the projection device according to an embodiment of the present disclosure.

Figure 3:
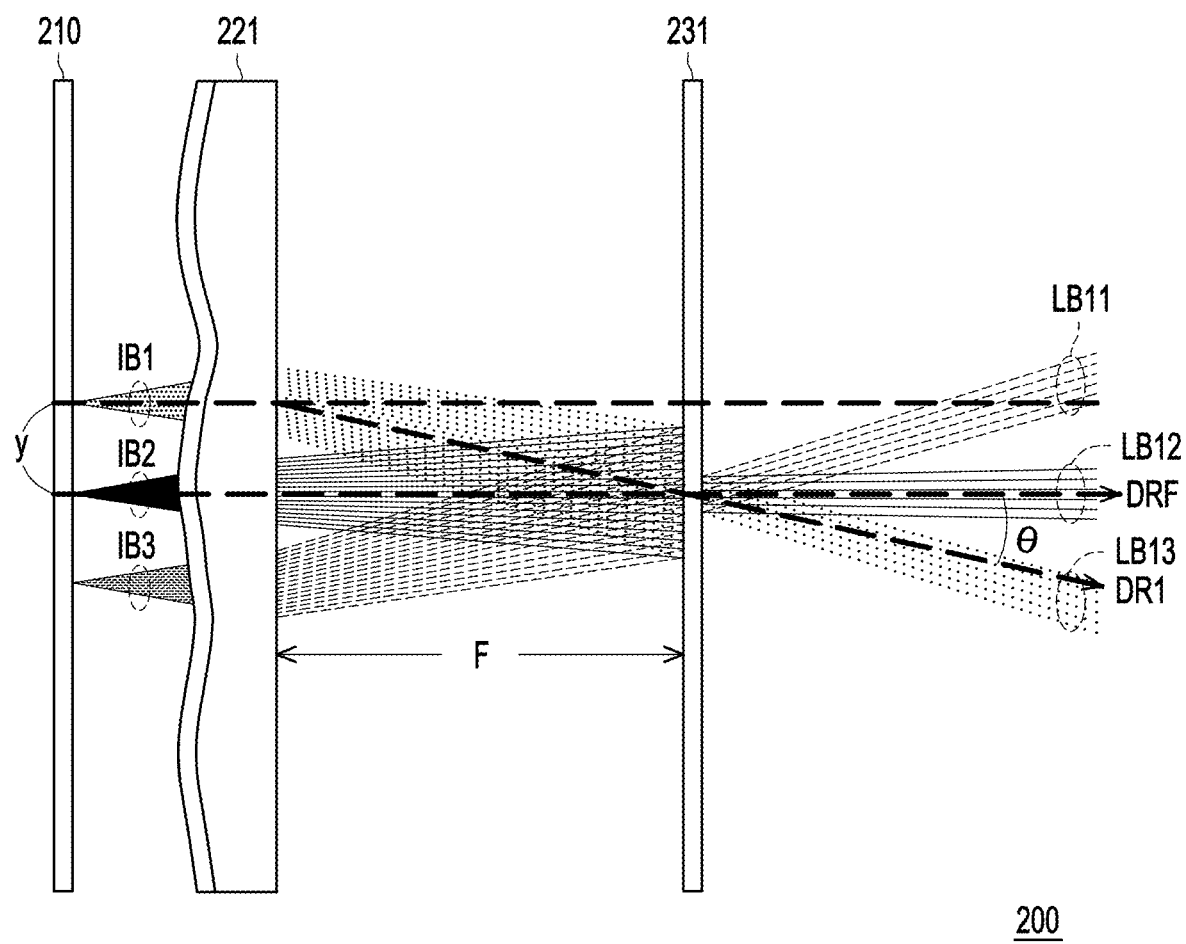
FIG. 3 is a schematic diagram illustrating a conversion method of image position information of an image beam and angle information of a traveling direction of a filtered image beam in a projection device according to an embodiment of the present disclosure.

In FIG. 3, taking the zone Z1 of the projection device 200 of FIG. 2 as an example, three positions of the display 210 respectively transmit different image beams IB1, IB2 and IB3. The transmitting position of the image beam IB2 is at the center of the display 210; the transmitting position of the image beam IB1 is above the display 210 and is separated by a distance y from the transmitting position of the image beam IB2; and the transmitting position of the image beam IB3 is below the display 210. In this embodiment, the image beam IB2 may be a central image beam, and the image position information of each image beam IB1, IB2, and IB3 may be the separation distance between the transmitting position of each image beam IB1, IB2 and IB3 on the display 210 and the transmitting position of the central image beam on the display 210. Taking this embodiment as an example, the image position information of the image beam IB1 may be equal to the separation distance y.

On the other hand, through the functions of the array lens 221 and the filter 231, the projection device 200 generates the filtered image beams LB13, LB12 and LB11 respectively corresponding to the image beams IB1, IB2 and IB3. In this embodiment, the traveling direction of the filtered image beam LB12 corresponding to the image beam IB2 serving as the central image beam may be used as the reference direction DRF, and the angle information of the filtered image beam LB13 corresponding to the image beam IB1 may be generated based on the angle θ between the traveling direction DR1 of the filtered image beam LB13 and the reference direction DRF.

In this embodiment, the distance between the corresponding array lens 221 and the filter 231 is equal to F, so the included angle $\theta = \tan^{-1}(y/F)$. It can be seen that the projection device 200 may convert the position information y of the image beam IB1 into the angle information θ of the filtered image beam LB13. It is worth mentioning that in order to ensure that the light beam passing through the filter 231 has better collimation, in the condition where the diameter of a single lens element of the array lens 221 is A, the aperture of the single element of the filter 231 is B, wherein $B < \frac{1}{4}A$.

Figure 4:
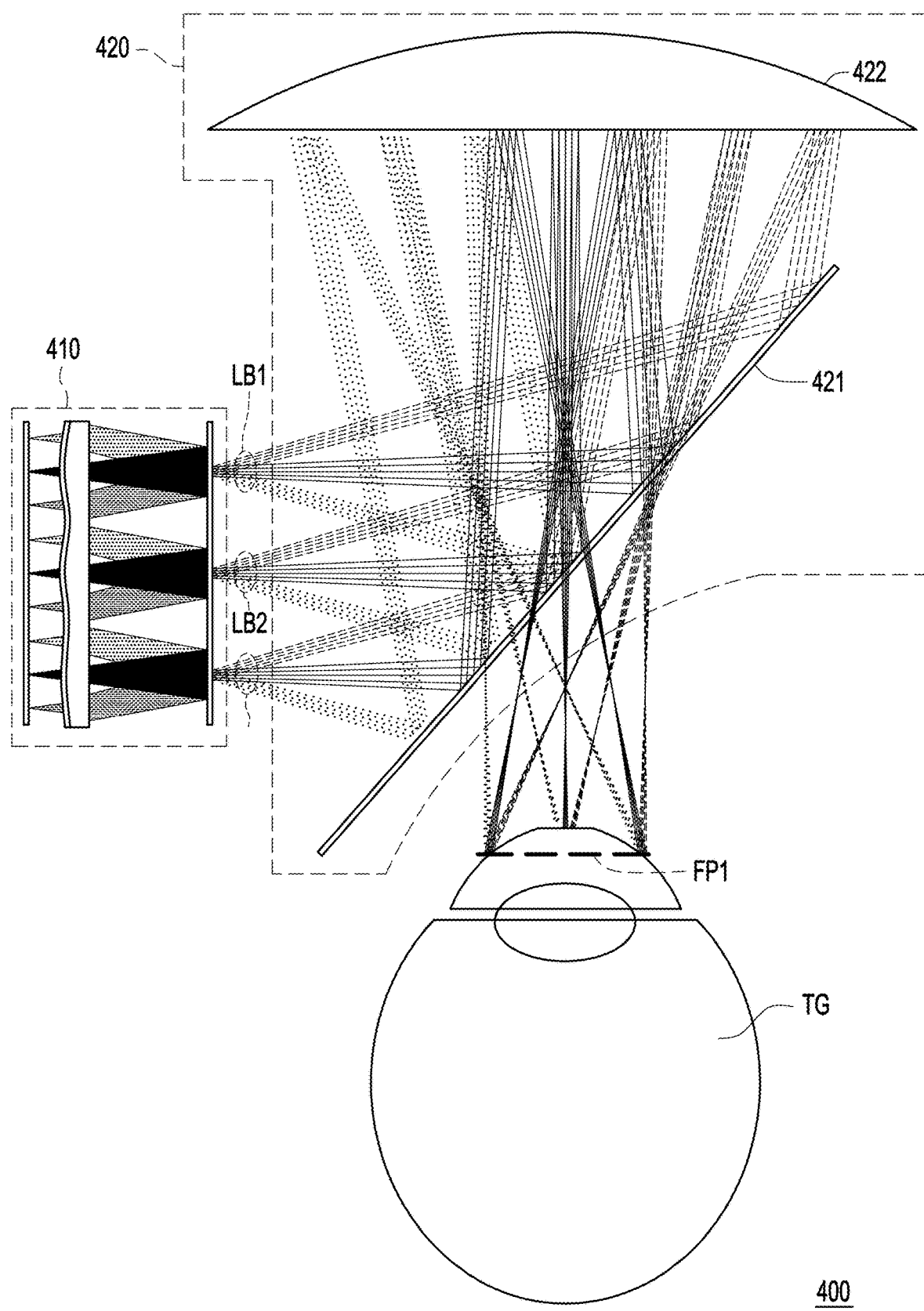
FIG. 4 is a schematic diagram of a virtual image display system according to another embodiment of the present disclosure.

Please refer to FIG. 4 below, FIG. 4 is a schematic diagram of a virtual image display system according to another embodiment of the present disclosure. The virtual image display system 400 includes a projection device 410 and an eye-resting device 420. The eye-resting device 420 is disposed between the projection device 410 and the target region TG. The target region TG may be a region corresponding to the user's eyeball.

The projection device 410 of this embodiment is similar to the projection device 200 of FIG. 2, and the relevant details will not be described again. In addition, the eye-resting device 420 of this embodiment includes a transflective element 421 and a reflector 422. The transflective element 421 is disposed on the light-emitting path of the projection device 410, that is, in the traveling direction of the filtered image beams LB1 to LB3 generated by the projection device 410, the transflective element 421 is disposed to receive the filtered image beams LB1 to LB3 transmitted by the projection device 410. The transflective element 421 is disposed to reflect the filtered image beams LB1 to LB3 to respectively generate a plurality of first reflected light beams. The plurality of first reflected light beams are projected to the reflector 422.

Further, the reflector 422 may receive the plurality of first reflected light beams and generate a plurality of second reflected light beams by converging and reflecting the first reflected light beams. The plurality of second reflected light beams may be projected to the transflective element 421 and pass through the transflective element 421 to be transmitted to the target region TG, and form images on the virtual aperture plane FP1 of the target region TG.

It is worth noting that in this embodiment, the plurality of second reflected light beams converged on the virtual aperture plane FP1 respectively have multiple different incident angles corresponding to the virtual aperture plane FP1. In this embodiment, through the combination of the projection device 410 and the eye-resting device 420, the light field information may be duplicated and reproduced. The virtual aperture at the user's eyeball (that is, the target region TG) may record the position coordinate parameters in the plenoptic function. Based on the displayed image, the light angle parameters, wavelength and time parameters may be recorded, and the light field may be completed accordingly.

Figure 5:
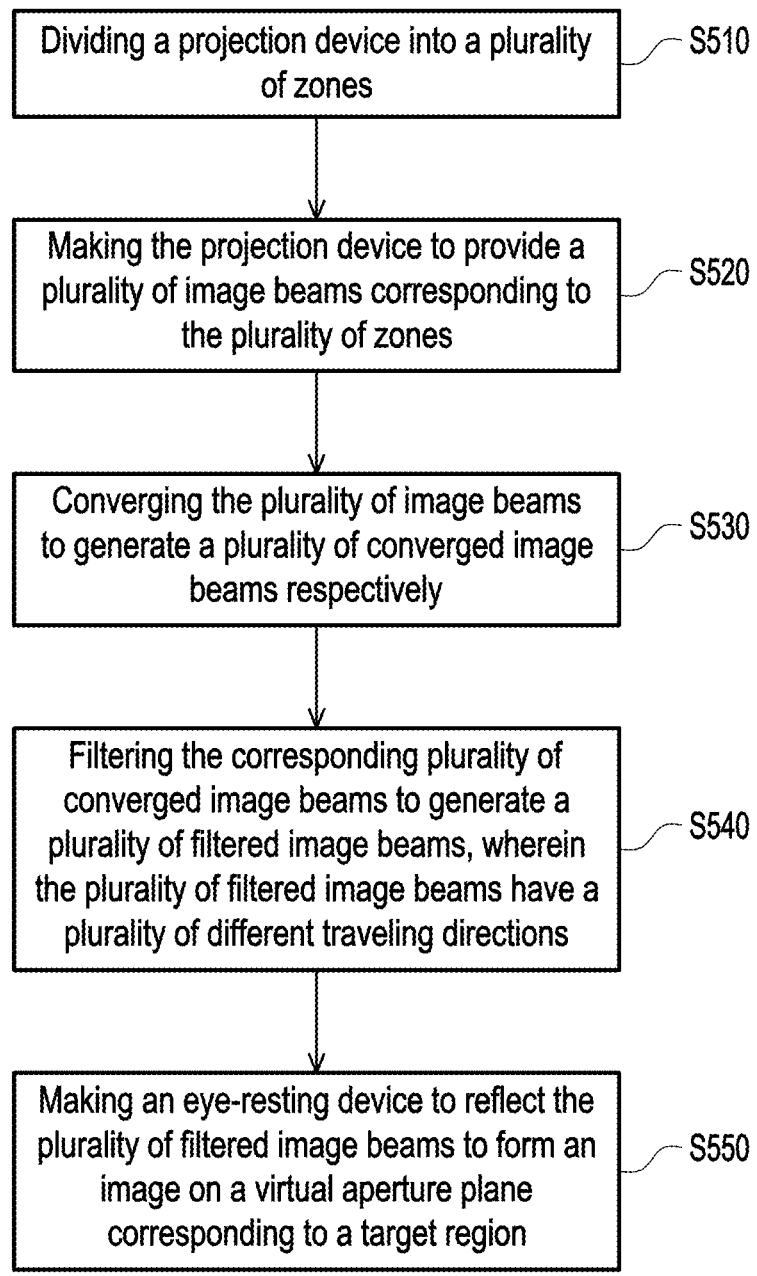
FIG. 5 is a flow chart of an image generation method according to an embodiment of the present disclosure.

Please refer to FIG. 5 below, FIG. 5 illustrates a flow chart of an image generation method according to an embodiment of the present disclosure. In step S510, the projection device is divided to have a plurality of zones. In step S520, the projection device may provide a plurality of image beams corresponding to the plurality of zones respectively. In step S530, the projection device may generate a plurality of converged image beams by converging the image beams. In step S540, the projection device filters the corresponding converged image beams to generate a plurality of filtered image beams, wherein the filtered image beams respectively have a plurality of different traveling directions. In step S550, the eye-resting device reflects the filtered image beam to form an image on the virtual aperture plane of the corresponding target region.

The implementation details of the above steps have been described in detail in the foregoing embodiments and implementation modes, and will not be described in detail below.

In summary, the virtual image display system of the present disclosure enables the eyeball accommodation function to respond correctly by providing correct image focal plane information. While the image depth is known, the plenoptic function information is provided and the VAC is overcome. The virtual image display system of the present disclosure may duplicate and reproduce light field information through the combination of a projection device and an eye-resting device. The virtual aperture at the eyeball may record position information in the plenoptic function, and may record angle information, wavelength information and time information according to the displayed image, and thereby providing complete light field information.

What is claimed is:

1. A virtual image display system, comprising:
    a projection device having a plurality of zones and disposed to:
        provide a plurality of image beams corresponding to each of the plurality of zones;
        converge the plurality of image beams to generate a plurality of converged image beams respectively; and
        filter the corresponding plurality of converged image beams to generate a plurality of filtered image beams, wherein the plurality of filtered image beams have a plurality of different traveling directions corresponding to each of the plurality of zones; and
    an eye-resting device disposed between the projection device and a target region, and reflecting the plurality of filtered image beams to form an image on a virtual aperture plane corresponding to the target region.

2. The virtual image display system according to claim 1, wherein the plurality of reflected filtered image beams have a plurality of different incident angles on the virtual aperture plane.

3. The virtual image display system according to claim 1, wherein traveling directions of a plurality of light rays in each of the plurality of filtered image beams are parallel to each other.

4. The virtual image display system according claim 1, wherein the projection device comprises:
    a display having a plurality of display regions respectively corresponding to the plurality of zones, and each of the plurality of display regions being disposed to provide the plurality of image beams;
    a plurality of array lenses respectively corresponding to the plurality of display regions, and each of the plurality of array lenses being disposed to converge the plurality of image beams transmitted by the corresponding each of the plurality of display regions;
    a plurality of filters disposed to filter the plurality of converged image beams generated by the corresponding each of the plurality of array lenses to generate the plurality of filtered image beams, wherein image rays in each of the plurality of filtered image beams are parallel to each other.

5. The virtual image display system according to claim 4, wherein each of the plurality of array lenses is a microlens array, each of the plurality of filters is an array pinhole filter, and the display is a flat-panel display.

6. The virtual image display system according to claim 4, wherein the projection device converts image position information of each of the plurality of image beams into angle information of the traveling direction of each of the plurality of filtered image beams.

7. The virtual image display system according to claim 6, wherein the angle information of the traveling direction of each of the plurality of filtered image beams is equal to an angle between the traveling direction of each of the plurality of filtered image beams and a reference direction, and the image position information of each of the plurality of image beams is a distance between the image position of each of the plurality of image beams and a central position of a central image beam.

8. The virtual image display system according to claim 7, wherein a tangent value of the angle information of each of the plurality of filtered image beams is equal to the image position information of each of the plurality of image beams divided by a distance between each of the plurality of array lenses and the corresponding filter.

9. The virtual image display system according to claim 4, wherein a diameter of a single lens element of each of the plurality of array lenses is A, and an aperture of a single element of corresponding the filter is B, wherein $B < \frac{1}{4}A$.

10. The virtual image display system according to claim 1, wherein the eye-resting device comprises:
    a transflective element disposed in the traveling direction of the plurality of filtered image beams to reflect the plurality of filtered image beams to respectively generate a plurality of first reflected image beams; and
    a reflector disposed in a traveling direction of the plurality of first reflected image beams to reflect and converge the plurality of first reflected image beams to generate a plurality of second reflected image beams, wherein the plurality of second reflected image beams pass through the transflective element to form an image on the virtual aperture plane.

11. The virtual image display system according to claim 10, wherein the transflective element is disposed between the reflector and the target region.

12. A virtual image display method, comprising:
dividing a projection device into a plurality of zones;
making the projection device to provide a plurality of image beams corresponding to each of the plurality of zones;
converging the plurality of image beams to generate a plurality of converged image beams respectively;
filtering the corresponding plurality of converged image beams to generate a plurality of filtered image beams, wherein the plurality of filtered image beams have a plurality of different traveling directions corresponding to each of the plurality of zones; and
making an eye-resting device to reflect the plurality of filtered image beams to form an image on a virtual aperture plane corresponding to a target region.

13. The virtual image display method according to claim 12, wherein the plurality of reflected filtered image beams have a plurality of different incident angles on the virtual aperture plane.

14. The virtual image display method according to claim 12, wherein a plurality of image rays in each of the plurality of filtered image beams are parallel to each other.

15. The virtual image display method according to claim 12, further comprising:
making the projection device to convert image position information of each of the plurality of image beams into angle information of the traveling direction of each of the plurality of filtered image beams.

16. The virtual image display method according to claim 15, wherein the angle information of the traveling direction of each of the plurality of filtered image beams is equal to an angle between the traveling direction of each of the plurality of filtered image beams and a reference direction, and the image position information of each of the plurality of image beams is a distance between the image position of each of the plurality of image beams and a central position of a central image beam.

* * * * *